US010103865B2

United States Patent
Takeda et al.

(10) Patent No.: US 10,103,865 B2
(45) Date of Patent: Oct. 16, 2018

(54) USER TERMINAL, BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 223 days.

(21) Appl. No.: 15/024,655

(22) PCT Filed: Sep. 19, 2014

(86) PCT No.: PCT/JP2014/074862
§ 371 (c)(1),
(2) Date: Mar. 24, 2016

(87) PCT Pub. No.: WO2015/046061
PCT Pub. Date: Apr. 2, 2015

(65) Prior Publication Data
US 2016/0218853 A1    Jul. 28, 2016

(30) Foreign Application Priority Data

Sep. 26, 2013  (JP) .................................. 2013-200015

(51) Int. Cl.
*H04L 1/00*    (2006.01)
*H04L 5/16*    (2006.01)
(Continued)

(52) U.S. Cl.
CPC ................ *H04L 5/16* (2013.01); *H04J 11/00* (2013.01); *H04L 5/14* (2013.01); *H04W 8/24* (2013.01);
(Continued)

(58) Field of Classification Search
CPC ......... H04L 47/70; H04L 47/72; H04L 47/74; H04L 47/78; H04L 47/80; H04L 47/10;
(Continued)

(56) References Cited

U.S. PATENT DOCUMENTS

2012/0218922 A1*  8/2012  Klingenbrunn ....... H04L 5/0053
370/280

OTHER PUBLICATIONS

International Search Report issued in corresponding application No. PCT/JP2014/074862 dated Dec. 2, 2014 (4 pages).
(Continued)

*Primary Examiner* — Dady Chery
(74) *Attorney, Agent, or Firm* — Osha Liang LLP

(57) ABSTRACT

The present invention is designed to enable appropriate transmission and reception in user terminals even when CA is executed by applying different duplex modes between multiple cells. A user terminal communicates with an FDD cell and a TDD cell by using carrier aggregation, and has a transmitting/receiving section that receives DL signals transmitted from each cell and transmits UL signals to each cell, and a report control section that controls reporting of capability information regarding simultaneous transmission and reception of the DL signals and UL signals in the transmitting/receiving section. The report control section controls reporting of the capability information regarding simultaneous transmission and reception of the transmitting/receiving section with respect to every combination of a frequency band to use in the FDD cell and a frequency band to use in the TDD cell.

12 Claims, 13 Drawing Sheets

(51) Int. Cl.
  *H04W 72/04* (2009.01)
  *H04W 8/24* (2009.01)
  *H04J 11/00* (2006.01)
  *H04L 5/14* (2006.01)

(52) U.S. Cl.
  CPC ....... *H04W 72/042* (2013.01); *H04W 72/048* (2013.01); *H04W 72/0413* (2013.01)

(58) Field of Classification Search
  CPC ............. H04W 28/02; H04W 28/0205; H04W 28/021; H04W 28/0247; H04W 28/0252; H04W 28/0257; H04W 28/0263; H04W 28/0268; H04W 28/0273
  USPC ......... 370/389–401, 351.498, 252, 238, 338, 370/469, 352, 230, 235, 369, 258, 402, 370/236; 709/245, 217–224, 230, 105, 709/206, 227–229, 238, 244; 455/445, 455/427, 452; 379/220.01, 114.02, 22
  See application file for complete search history.

(56) References Cited

OTHER PUBLICATIONS

Written Opinion of the International Searching Authority issued in corresponding application No. PCT/JP2014/074862 dated Dec. 2, 2014 (5 pages).

3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

CMCC, "Email summary on FDD and TDD joint operation"; 3GPP TSG-RAN WG1 #74, R1-133811; Barcelona, Spain, Aug. 19-23, 2013 (18 pages).

CMCC, "Discussion on full/non-full duplex UE for TDD-FDD CA"; 3GPP TSG RAN WG1 Meeting #75, R1-135629; San Francisco, USA, Nov. 11-15, 2013 (4 pages).

Office Action issued in corresponding Japanese Patent Application No. 2013-200015, dated Oct. 10, 2017 (9 pages).

\* cited by examiner

FIG.3A

Cell#1
Cell#2

FIG.3B

Cell#1
Cell#2

USER TERMINAL, BASE STATION AND RADIO COMMUNICATION METHOD

TECHNICAL FIELD

The present invention relates to a user terminal, a base station and a radio communication method that are applicable to a next-generation communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE, and the specifications thereof have been drafted (Rel. 10/11).

As duplex modes for radio communication in the LTE and LTE-A systems, there are frequency division duplex (FDD) to divide frequencies between the uplink (UL) and the downlink (DL), and time division duplex (TDD) to divide time between the uplink and the downlink (see FIG. 1A). In TDD, the same frequency region is applied to uplink and downlink communication, and signals are transmitted and received to and from one transmitting/receiving point by dividing time between the uplink and the downlink.

Furthermore, the half-duplex FDD scheme is another duplex mode. The half-duplex FDD scheme is a communication scheme which, similar to the FDD scheme, allocates different frequency regions between the uplink and the downlink, and which does not carry out uplink communication and downlink communication at the same time with respect to a given user terminal. That is, uplink communication and downlink communication with respect to a given user terminal are separated based on time. This separation of uplink communication and downlink communication based on time is shared in common with the TDD scheme operation.

Also, the system band of the LTE-A system (Rel. 10/11) includes at least one component carrier (CC), where the system band of the LTE system constitutes one unit. Gathering a plurality of component carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

As noted earlier, in FDD, communication is carried out using different frequency bands between UL and DL (full-duplex). Although UL and DL are divided in the frequency direction, depending on user terminal capabilities, the arrangement of the UL and DL frequencies and so on, cases might occur where UL transmission interferes with DL transmission and therefore it is not possible to receive in DL and transmit in UL at the same time. Meanwhile, this problem does not occur with TDD and half-duplex FDD, in which communication is carried out by dividing time between UL and DL.

For example, a user terminal that employs FDD full-duplex is mounted with a duplexer so that UL signals transmitted from the user terminal do not interfere with the receiver provided in the user terminal for receiving DL signals. However, if a user terminal is not mounted with a duplexer (or the duplexer's performance is low), or depending on the arrangement of the UL and DL frequencies, the user terminal is unable to carry out simultaneous transmission and reception of UL signals and DL signals. So, heretofore, to solve this problem, a limitation has been placed on simultaneous transmission and reception by applying half-duplex FDD to user terminals that are not capable of simultaneous transmission and reception.

Now, in carrier aggregation (CA), which was introduced in Rel. 10/11, the duplex mode to employ between a plurality of CCs (also referred to as "cells," "transmitting/receiving points," etc.) is limited to the same duplex mode (see FIG. 1B). On the other hand, future radio communication systems (for example, Rel. 12 and later versions) may anticipate CA to employ different duplex modes (TDD+FDD) between multiple CCs (see FIG. 1C).

In this case, a user terminal has to use at least three different frequency bands, namely the DL frequency band of FDD, the UL frequency band of FDD and the DL/UL frequency band of TDD. Consequently, depending on the user terminals' transmitting/receiving capabilities, the locations of frequency bands that are subject to CA (for example, the locations of the FDD and TDD frequency bands) and so on, there is a threat of causing a decrease of received quality in the user terminal due to simultaneous transmission and reception, a decrease of throughput due to inadequate limitations of simultaneous transmission and reception and so on, and making the user terminal unable to transmit and receive adequately.

The present invention has been made in view of the above, and it is therefore an object of the present invention to provide a user terminal, a base station and a radio communication method which allow adequate transmission and reception in user terminals even when CA is executed by applying different duplex modes between multiple cells.

Solution to Problem

The present invention provides a user terminal that communicates with an FDD cell and a TDD cell by using carrier aggregation, the user terminal having: a transmitting/receiving section that receives DL signals transmitted from each cell and transmits UL signals to each cell, and a report control section that controls reporting of capability information regarding simultaneous transmission and reception of the DL signals and UL signals in the transmitting/receiving section, wherein the report control section controls reporting of the capability information regarding simultaneous transmission and reception of the transmitting/receiving section with respect to every combination of a frequency band to use in the FDD cell and a frequency band to use in the TDD cell.

Advantageous Effects of Invention

According to the present invention, it is possible to allow adequate transmission and reception in user terminals even when CA is executed by applying different duplex modes between multiple cells.

BRIEF DESCRIPTION OF DRAWINGS

FIG. 3 provides diagrams to show example cases where different DL/UL configurations are applied between cells;

DESCRIPTION OF EMBODIMENTS

Figure 1A:
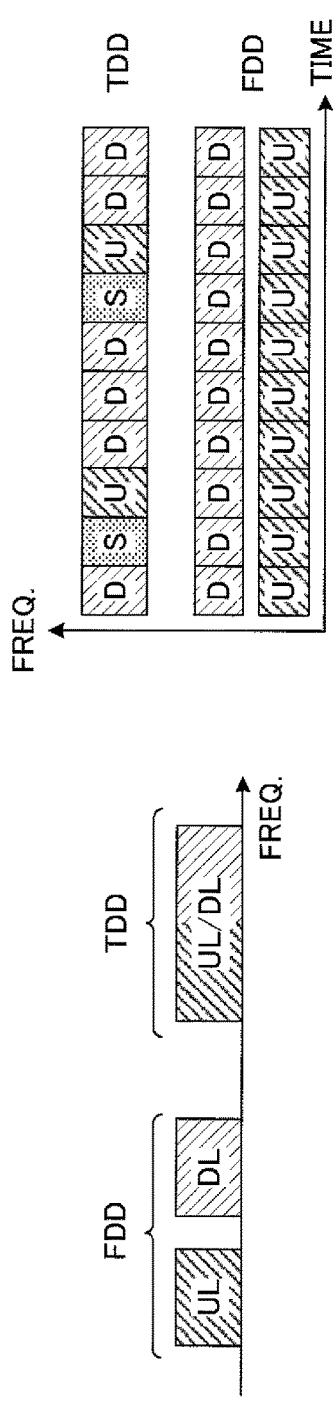
FIG. 1 provides diagrams to explain an overview of duplex modes in LTE and LTE-A, and intra-base station CA (intra-eNB CA)
Figure 1B:
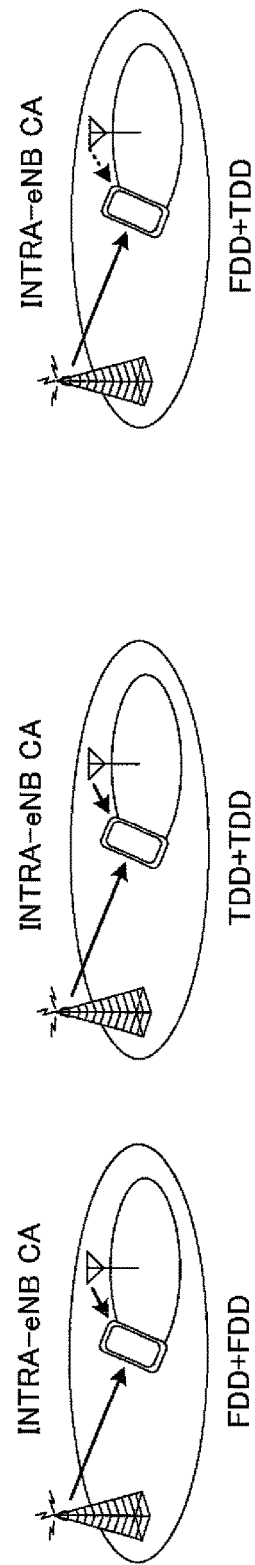

As noted earlier, two duplex modes—namely, FDD and TDD—are stipulated in the LTE and LTE-A systems (see above FIG. 1A). Also, support for intra-base station CA (intra-eNB CA) has been provided since Rel. 10. However, CA in Rel. 10/11 is limited to use of the same duplex mode (FDD+FDD intra-eNB CA or TDD+TDD intra-eNB CA) (see above FIG. 1B).

Figure 1C:
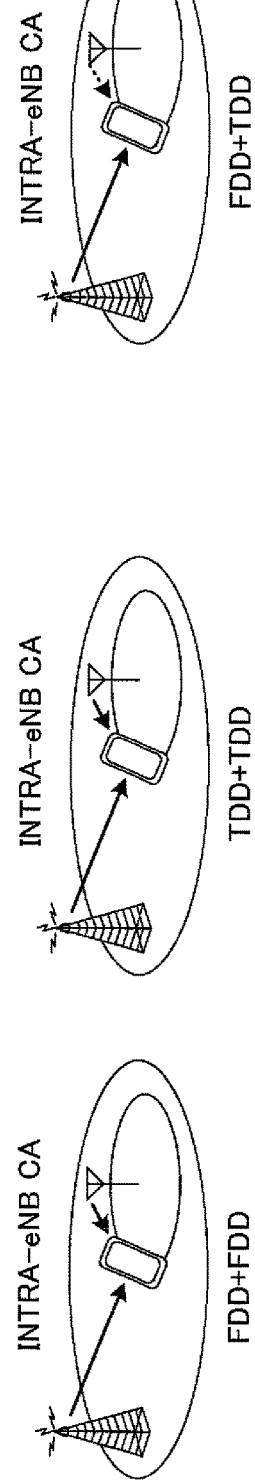
Figure 2:
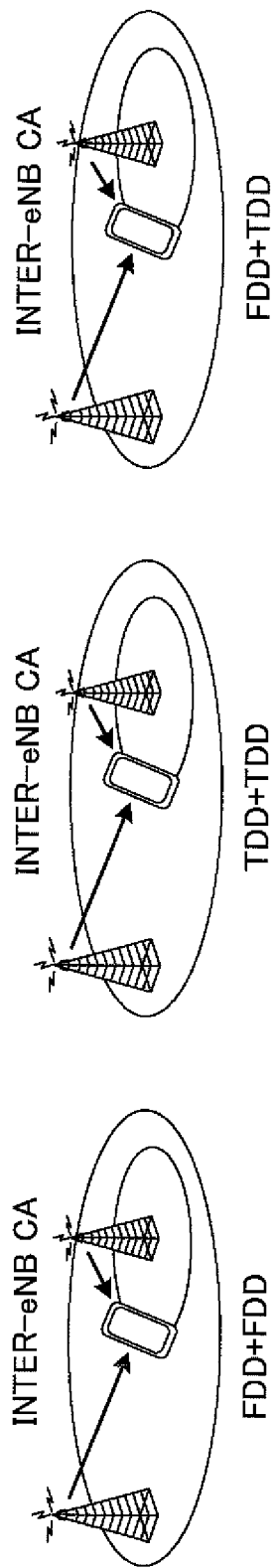
FIG. 2 is a diagram to explain inter-base station CA (inter-eNB CA)

Meanwhile, the systems of Rel. 12 and later versions are presumed to provide presume intra-base station CA (intra-eNB CA) employing different duplex modes (TDD+FDD) between multiple CCs (see above FIG. 1C). Furthermore, the systems of Rel. 12 and later versions are also presumed to employ inter-base station CA (inter-eNB CA) (see FIG. 2). Note that inter-base station CA is preferably supported regardless of the duplex mode, and it may be possible to introduce inter-base station CA that accommodates different duplex modes (TDD+FDD).

In intra-base station CA (intra-eNB CA), scheduling is controlled using one scheduler between multiple cells. Meanwhile, in inter-base station CA (inter-eNB CA), schedulers are provided separately for respective multiple cells so that scheduling is controlled on a per cell basis. Also, in inter-eNB CA it is presumed that each base station is connected in such a manner that the delay is not negligible (non-ideal backhaul connection).

Now, there are eases where a user terminal is unable to transmit and receive UL signals and DL signals at the same time (that is, incapable of full duplex) depending on the combination of frequency bands that are subject to CA, the user terminals' design (the duplexer's performance), and so on. For example, when the frequency band used in UL and the frequency band used in DL neighbor each other, there is a threat that unwanted emission is produced in neighboring bands when UL signals are transmitted and interferes with DL signals. In this case, the user terminal is unable to transmit UL signals and receive DL signals at the same time.

Also, when the full-duplex FDD scheme is implemented, a duplexer needs to be mounted in order to prevent UL signals from interfering with the receiver provided in the user terminal for receiving DL signals. However, depending on the conditions of implementation of the duplexer, there might occur a case where simultaneous transmission and reception of UL signals and DL signals are not possible.

Consequently, in FDD, signaling (UE capability signaling) for allowing a user terminal being incapable of simultaneous transmission and reception to report information regarding its capabilities for simultaneous transmission and reception to the NW (for example, base stations) is stipulated on a per frequency band basis. For example, a user terminal that cannot transmit UL signals and receive DL signals at the same time in the FDD cell (that is, incapable of simultaneous transmission and reception) sends a report to that effect to the base station.

To be more specific, a user terminal that employs FDD reports whether to use full-duplex or use half-duplex, in one bit, on a per frequency band basis. Note that, since TDD uses the same frequency in UL and DL, there is no stipulation regarding this report.

Meanwhile, in Rel. 11, a structure to make the ratio of DL and UL transmissions vary between CCs in each of a plurality of cells (base stations) that employ TDD-TDD CA ("TDD inter-band CA with different UL-DL configurations") was introduced. Now, a case to employ different DL/UL configurations per cell will be described below.

In TDD up to the Rel. 10 system, the configuration ratio of UL and DL has had a plurality of patterns (DL/UL configurations 0 to 6), and, in each DL/UL configuration, the DL subframes corresponding to a UL subframe are determined. For example, FIG. 3A shows a case where each cell (cell #1 and cell #2) employs DL/UL configuration 3 (DL/UL Config. 3). Also, FIG. 3B shows a case where one cell (cell #1) employs DL/UL configuration 3 (DL/UL Config. 3) and the other cell (cell #2) employs DL/UL configuration 4 (DL/UL Config. 4).

As shown in FIG. 3A, when the same DL/UL configuration is employed between different cells, simultaneous transmission and reception of DL signals and UL signals do not take place in a user terminal. On the other hand, as shown in FIG. 3B, when different DL/UL configurations are employed between different cells, there might occur a case where simultaneous transmission and reception of DL signals and UL signals take place in a user terminal.

In this way, when different DL/UL configurations are employed between different cells, even in TDD, the problem that a user terminal is unable to transmit and receive UL signals and DL signals at the same time arises, depending on the combination of frequency bands that are subject to CA, the user terminal's design (the duplexer's performance), and so on.

To solve this problem, in TDD inter-band CA with different UL-DL configurations, signaling (UE capability signaling) for allowing a user terminal being incapable of simultaneous transmission and reception to report information regarding its capabilities for simultaneous transmission and reception to the NW (for example, base stations) is introduced. For example, a user terminal that is capable of simultaneous transmission and reception sends a report to that effect (for example, whether or not simultaneous transmission and reception (simultaneous Rx-Tx) are possible) to the base stations. To be more specific, when the use of different DL/UL configurations between cells is allowed in TDD-TDD CA, the user terminal reports whether or not to support simultaneous transmission and reception (simultaneous Rx-Tx) to the base stations for every combination of frequency bands that are subject to CA.

Consequently, when CA is executed by applying different duplex modes between multiple CCs (cells) (TDD-FDD CA), it may be possible to report the above-mentioned capability information regarding simultaneous transmission and reception from the user terminal.

However, the present inventors have found out that TDD-FDD CA produces a plurality of cases where a user terminal is incapable of simultaneous transmission and reception, and that existing signaling has a threat of only leading to a decrease of received quality in the user terminal due to simultaneous transmission and reception and a decrease of throughput due to inadequate limitations of simultaneous transmission and reception. Now, a case where simultaneous transmission and reception are disabled in TDD-FDD CA will be described below. Note that the arrangements and structures of the frequency bands of the FDD cell and the TDD cell shown in following FIG. 4 to FIG. 6 are only examples and are by no means limiting.

Figure 4A:
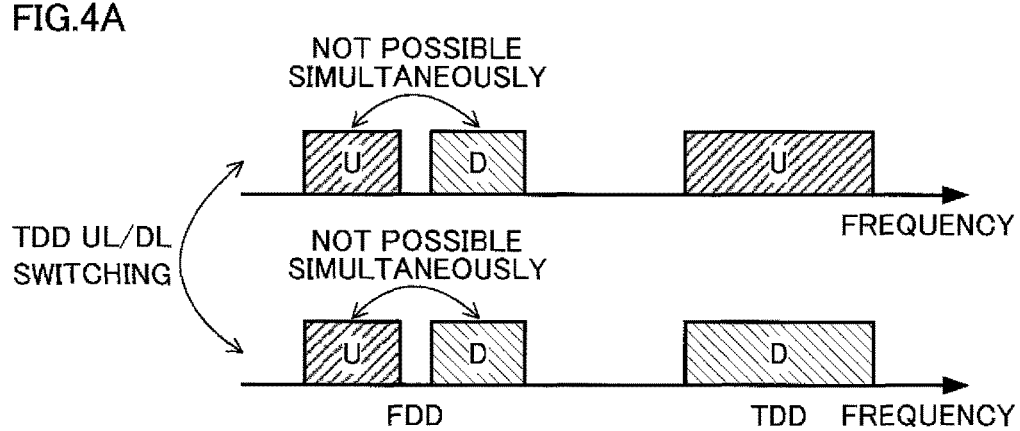
FIG. 4 provides diagrams to explain relationships between examples of arrangements of FDD cell frequency bands and TDD cell frequency bands in TDD-FDD CA and simultaneous transmission and reception in a user terminal.

As shown in FIG. 4A, cases may occur where full-duplex in FDD is not possible in TDD-FDD CA. In this case, a user terminal cannot transmit and receive UL signals and DL signals at the same time in the FDD cell, and therefore has to employ half-duplex.

Figure 4B:
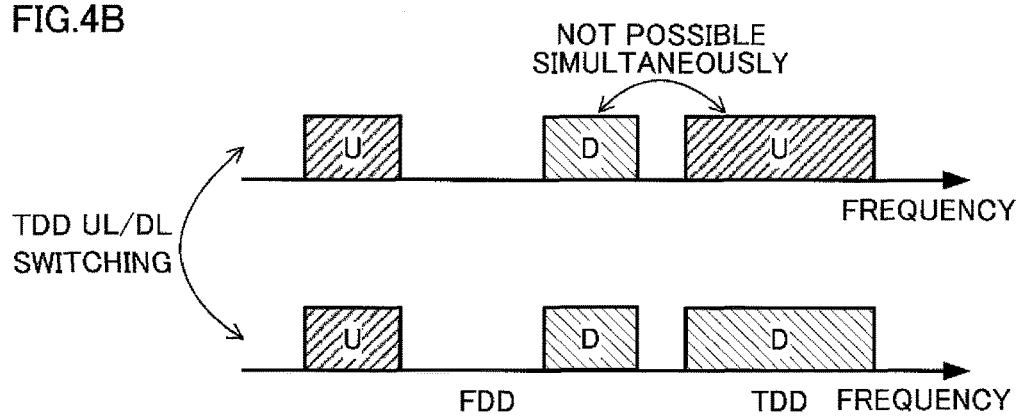

Alternatively, as shown in FIG. 4B, cases might occur where simultaneous transmission and reception in FDD DL and TDD UL in TDD-FDD CA are not possible. In this case, a user terminal becomes capable of full-duplex in the FDD cell and simultaneous reception in the UL frequency band of the FDD cell and the DL frequency band of the TDD cell. Note that, although the UL and DL frequency bands do not change in TDD, UL and DL are switched in the time domain and controlled.

Figure 5A:
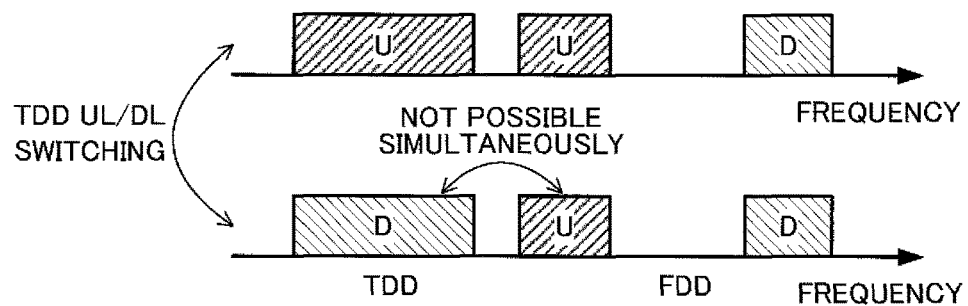
FIG. 5 provides diagrams to explain relationships between examples of arrangements of FDD cell frequency bands and TDD cell frequency bands in TDD-FDD CA and simultaneous transmission and reception in a user terminal.
Figure 6A:
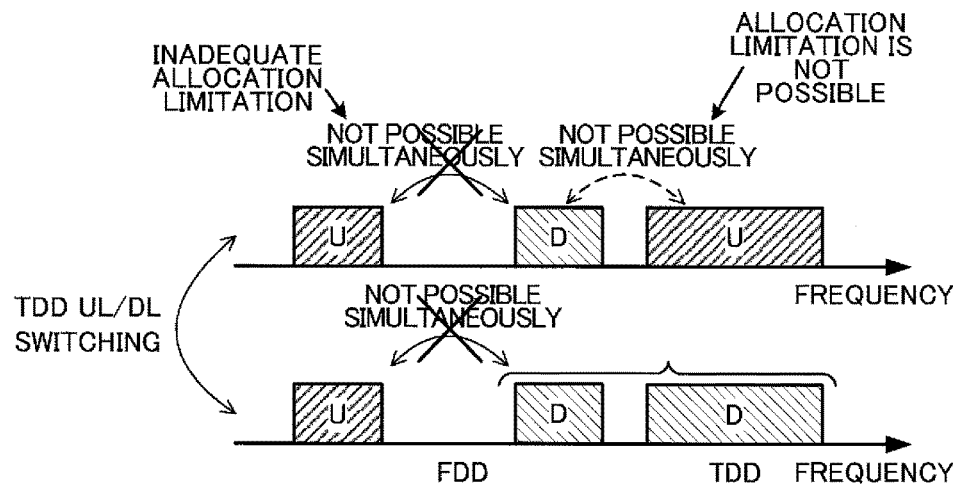
FIG. 6 provides diagrams to explain relationships between examples of arrangements of FDD cell frequency bands and TDD cell frequency bands in TDD-FDD CA and simultaneous transmission and reception in a user terminal.

Alternatively, as shown in FIG. 5A, cases might occur where simultaneous transmission and reception of FDD UL and TDD DL in TDD-FDD CA are not possible. In this case, a user terminal becomes capable of full-duplex in the FDD cell, and simultaneous reception in the DL frequency band of the FDD cell and the UL frequency band of the TDD cell.

Figure 5B:
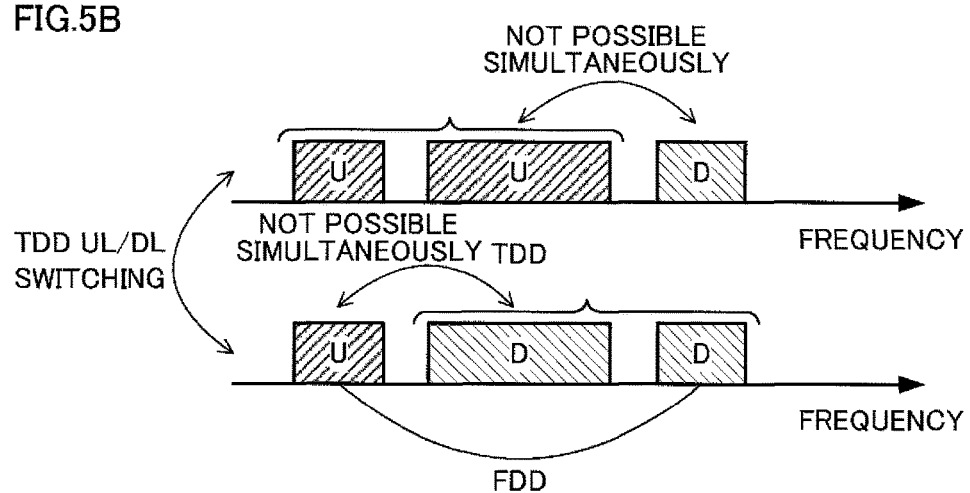

Alternatively, as shown in FIG. 5B, cases might occur in TDD-FDD CA where simultaneous transmission and reception are not possible in all frequencies subject to CA. In this case, a user terminal cannot transmit and receive UL signals and DL signals at the same time in the FDD cell or in the TDD cell.

In this way, when TDD-FDD CA is employed, there are a number of cases where a user terminal is unable to transmit and receive DL signals and UL signals simultaneously, depending on the combination of frequency bands. In this case, assume that the user terminal employs the above-mentioned signaling of capability information regarding simultaneous transmission and reception (capability signaling). Note that the above-mentioned signaling of capability information regarding simultaneous transmission and reception can be reported in only two patterns of cases, namely (1) the case where full-duplex is not possible in the FDD CC (controlled by a half-duplex report) and (2) the case where simultaneous transmission and reception are not possible in all frequencies that are subject to CA (controlled by a simultaneous Rx-Tx report).

For example, assume a case here where a user terminal are incapable of simultaneous transmission and reception in the DL frequency band of FDD and the UL frequency band of TDD (see FIG. 4B). In this case, if the user terminal uses a FDD half-duplex report, it is judged that simultaneous transmission and reception of FDD UL and FDD DL are not possible, and, furthermore, it becomes not possible to limit simultaneous transmission and reception in FDD DL and TDD UL (see FIG. 6A). That is, an inadequate limitation of allocation is placed on the FDD cell, and, furthermore, it is not possible to limit allocation between the FDD cell and the TDD cell.

Figure 6B:
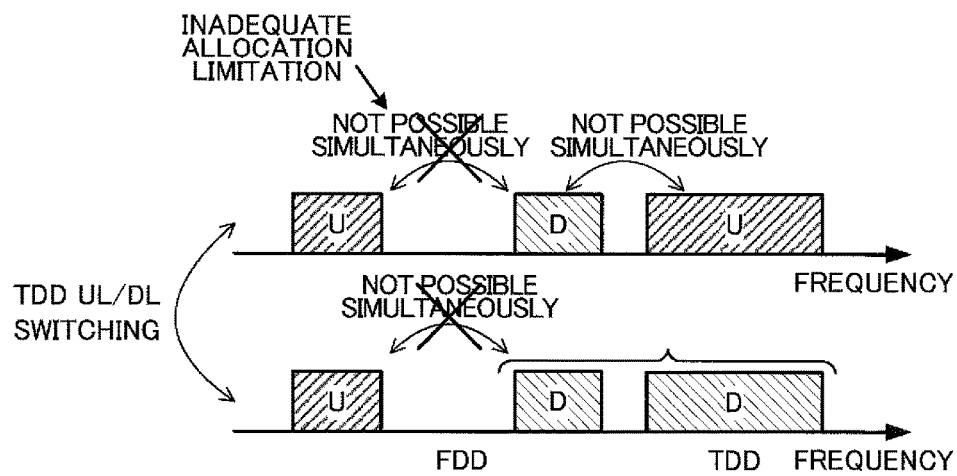

Also, when a user terminal uses a simultaneous Rx-Tx report, which limits simultaneous transmission and reception in all frequencies that are subject to CA, it is judged that simultaneous transmission and reception are not possible in all of the FDD and TDD frequencies (see FIG. 6B). As a result of this, the problem arises where FDD UL and FDD DL, which originally allow simultaneous transmission and reception, are judged to be incapable of simultaneous transmission and reception and are limited inadequately. Furthermore, simultaneous transmission and reception in the UL frequency band of FDD and the DL frequency band for TDD are also limited.

So, the present inventors have come up with the idea that, when TDD-FDD CA is employed, a user terminal may signal capability information regarding simultaneous transmission and reception, for every combination of the DL frequency band and the UL frequency band in FDD and the DL/UL frequency bands in TDD. By this means, the NW learns the user terminal's capabilities for simultaneous transmission and reception in each frequency band in TDD and FDD accurately and executes scheduling, so that the decrease of received quality in the user terminal due to simultaneous transmission and reception and the decrease of throughput due to inadequate limitations of simultaneous transmission and reception can be prevented. Now, the present embodiment will be described below in detail.

First Embodiment

A case will be described here with a first embodiment where, for TDD-FDD CA, reporting of capability information regarding simultaneous transmission and reception (simultaneous Rx-Tx capability signaling) for every combination of frequency bands that are subject to CA (CA band combination) is introduced.

To be more specific, information as to whether or not simultaneous transmission and reception are applicable is stipulated to be signaled as a frequency band combination parameter for every separate combination of frequency bands (CA band combination). Band combination parameters may stipulate the CA bandwidth in DL or UL, the number of MIMO layers in DL or UL and so on, for every combination of frequency bands that are subject to CA.

In this case, among the information elements (UE-EUTRA-capability information elements) to define user terminal's capabilities, capability information regarding simultaneous transmission and reception is stipulated in the form of band combination parameters. The user terminal reports the capability information regarding simultaneous transmission and reception, stipulated in each band combination parameter, to the NW (for example, the base stations) as user terminal capability information (UE capability signaling). That is, each band combination parameter is associated with whether or not simultaneous transmission and reception are possible with this band combination, and stipulated.

As capability information regarding simultaneous transmission and reception, information as to whether or not a user terminal is capable of simultaneous transmission and reception with respect to the combination of the DL frequency band of the FDD cell and the UL frequency band of the TDD cell, and whether or not the user terminal is capable of simultaneous transmission and reception with respect to the combination of the UL frequency band of the FDD cell and the DL frequency band of the TDD cell, can be stipulated. Furthermore, information to the effect that simultaneous transmission and reception need not be limited in each frequency band (full-duplex), and information to the effect that simultaneous transmission and reception are not possible in all frequencies subject to CA are stipulated. The user terminal judges the subject terminal's simultaneous transmission and reception capability for each frequency band combination, and sends a report to the base stations.

For example, as capability information regarding simultaneous transmission and reception, the user terminal can select and report one of the stipulations (1) full-duplex (no limitation of simultaneous transmission and reception is necessary), (2) simultaneous transmission and reception in FDD DL and TDD UL are not possible, (3) simultaneous transmission and reception in FDD UL and TDD DL are not possible, and (4) simultaneous transmission and reception are not possible in all frequencies that are subject to CA. In this case, the capability information regarding simultaneous transmission and reception can be stipulated in two bits.

A case is assumed here where a user terminal is incapable of simultaneous transmission and reception in the DL frequency band of FDD and the UL frequency band of TDD (see FIG. 4B). In this case, the user terminal sends a report of above (2) simultaneous transmission and reception in FDD DL and TDD UL are not possible, to the NW, as capability information regarding simultaneous transmission and receipt. By this means, each base station can learn the user terminal's capabilities for simultaneous transmission and reception accurately, and schedule UL signals and DL signals of each frequency band adequately (see FIG. 7).

In this way, by employing a structure in which whether or not a user terminal is capable of simultaneous transmission and reception with respect to the combinations of the FDD cell's DL frequency and UL frequency band and the TDD cell's DL/UL frequency bands, even in TDD-FDD CA, the NW can learn each user terminal's capabilities for simultaneous transmission and reception accurately. Then, each base station that employs CA executes scheduling control based on each user terminal's capabilities for simultaneous transmission and reception, so that the decrease of received quality in user terminals due to simultaneous transmission and reception and the decrease of throughput due to inadequate limitations of simultaneous transmission and reception can be prevented Second Embodiment A case will be described here as a second embodiment where, for TDD-FDD CA, reporting of capability information regarding simultaneous transmission and reception on a per user terminal basis is introduced. That is, with the second embodiment, capability information signaling (capability signaling) is introduced in every individual user terminal.

In this case, reporting is controlled by stipulating capability information regarding simultaneous transmission and reception (for example, simultaneous Rx-Tx) in the information elements (UE-EUTRA-capability information elements) that define user terminal's capabilities. For the capability information regarding simultaneous transmission and reception, pieces of information including (1) full-duplex (no limitation of simultaneous transmission and reception is necessary), (2) simultaneous transmission and reception in FDD DL and TDD UL are not possible, (3) simultaneous transmission and reception in FDD UL and TDD DL are not possible, and (4) simultaneous transmission and reception are not possible in all frequencies that are subject to CA, can be stipulated in two bits. The user terminal selects one in accordance with the subject terminal's simultaneous transmission and reception capabilities, and reports this to the base stations.

Note that restrictions of simultaneous transmission and reception for each combination of frequency bands (CA band combination) may be stipulated in advance. The restrictions of simultaneous transmission and reception per combination of the UL frequency band and the DL frequency band of FDD and the DL/UL frequency bands of TDD may be, for example, stipulated in a similar fashion to the contents of the above-described simultaneous transmission and reception capabilities ((1) to (4)), which are stipulated on a per user terminal basis In this case, each cell's base station controls scheduling, on a per user terminal basis, based on the capability information regarding simultaneous transmission and reception reported from the user terminals, and whether or not simultaneous transmission and reception are applicable, which is stipulated in advance for every frequency band combination. At this time, if the capability information regarding simultaneous transmission and reception reported from a user terminal and a restriction condition for simultaneous transmission and reception, which is stipulated in advance for every frequency band combination, are different, the base stations can control scheduling based on the condition of the greater restriction.

In this way, by employing a structure to report whether or not a user terminal is capable of simultaneous transmission and reception with respect to the combinations of the FDD cell's DL frequency band and UL frequency band and the TDD cell's DL/UL frequency bands, even in TDD-FDD CA, the NW can learn each user terminal's capabilities for simultaneous transmission and reception accurately. Then, each base station that employs CA controls scheduling based on each user terminal's capabilities for simultaneous transmission and reception, so that the decrease of received quality in user terminals due to simultaneous transmission and reception and the decrease of throughput due to inadequate limitations of simultaneous transmission and reception can be prevented. Also, with the second example, there is no need to report the restrictions of simultaneous transmission and reception for every combination per frequency band separately, by way of capability information signaling, so that it is possible to reduce the overhead of capability information signaling (capability signaling).

Third Embodiment

With a third embodiment, as in the above-described second embodiment, for TDD-FDD CA, reporting of capability information regarding simultaneous transmission and reception on a per user terminal basis is introduced. Meanwhile, restrictions for simultaneous transmission and reception are not stipulated per frequency band combination (CA band combination), but are controlled in the scheduler of the base stations.

Similar to the above-described second embodiment, as the capability signaling (capability information regarding simultaneous transmission and reception) to transmit per user terminal, pieces of information including (1) full-duplex (no limitation of simultaneous transmission and reception is necessary), (2) simultaneous transmission and reception in FDD DL and TDD UL are not possible, (3) simultaneous transmission and reception in FDD UL and TDD DL are not possible, and (4) simultaneous transmission and reception are not possible in all frequencies that are subject to CA can be stipulated in two bits. Also, the user terminal selects one in accordance with subject terminal's simultaneous transmission and reception capabilities and reports this to the base stations.

Meanwhile, with the third embodiment, the restriction conditions for simultaneous transmission and reception are not reported to the user terminal for every combination of CA frequency bands (CA band combination), so that, if there are restrictions per frequency band combination, the base stations execute control upon scheduling. In this case, if the capability information regarding simultaneous transmission and reception that is reported from a user terminal, and a restriction condition for simultaneous transmission and reception, which is stipulated per frequency band combination, are different, the base stations can control scheduling based on the condition of the greater restriction.

Variation

Note that the present embodiment (for example, the above-described first to third embodiments) is not limited to intra-eNB CA, and may be applied to inter-eNB CA as well. In the event of inter-eNB CA, as mentioned earlier, dynamic coordination is difficult between base stations that execute CA, but semi-static coordination with other base stations is possible based on capability information regarding simultaneous transmission and reception reported from user terminals. By this means, control to avoid simultaneous transmission and reception between different frequency bands is made possible.

Figure 8A:
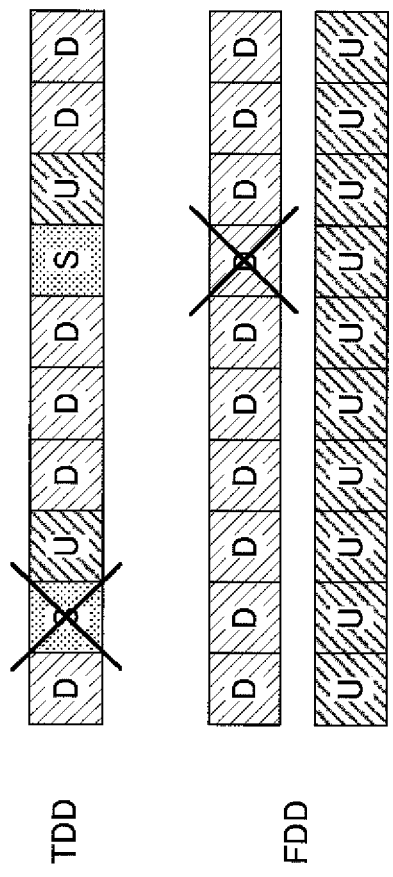
FIG. 8 provides diagrams to explain examples of scheduling between the FDD cell and the TDD cell in inter-eNB CA.

For example, assume a case where simultaneous transmission and reception in FDD DL and TDD UL are not possible. In this case, in timings in which FDD DL and TDD UL turn up at the same time, allocation (scheduling) is carried out for only one, and switched over time. For example, in subframes where FDD DL and TDD UL overlap, control is executed so that subframes in which TDD UL allocation is not carried out and subframes in which FDD DL allocation is not carried out are switched over time as appropriate (see FIG. 8A).

Figure 8B:
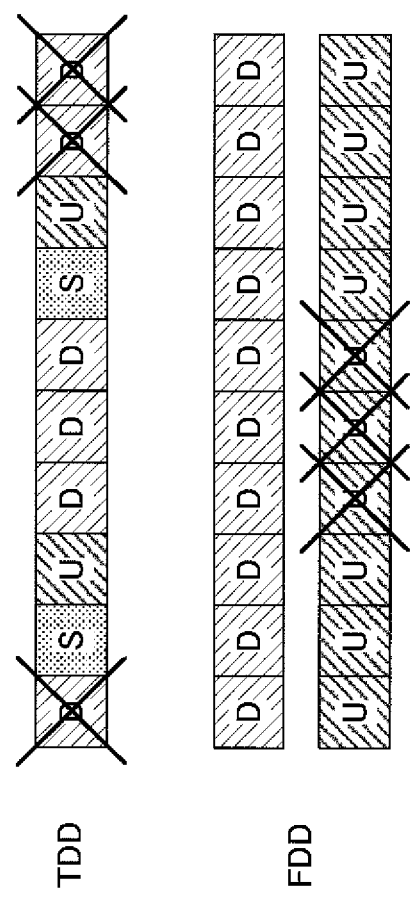

Also, for example, assume a case here where simultaneous transmission and reception in FDD UL and TDD DL are not possible. In this case, in timings in which FDD UL and TDD DL turn up at the same time, allocation (scheduling) is carried out for only one, and switched over time. For example, in subframes where FDD UL and TDD DL overlap, control is executed so that subframes in which TDD DL allocation is not carried out and subframes in which FDD UL allocation is not carried out are switched over time as appropriate (see FIG. 8B).

Structure of Radio Communication System

Now, an example of a radio communication system according to the present embodiment will be described in detail below.

Figure 9:
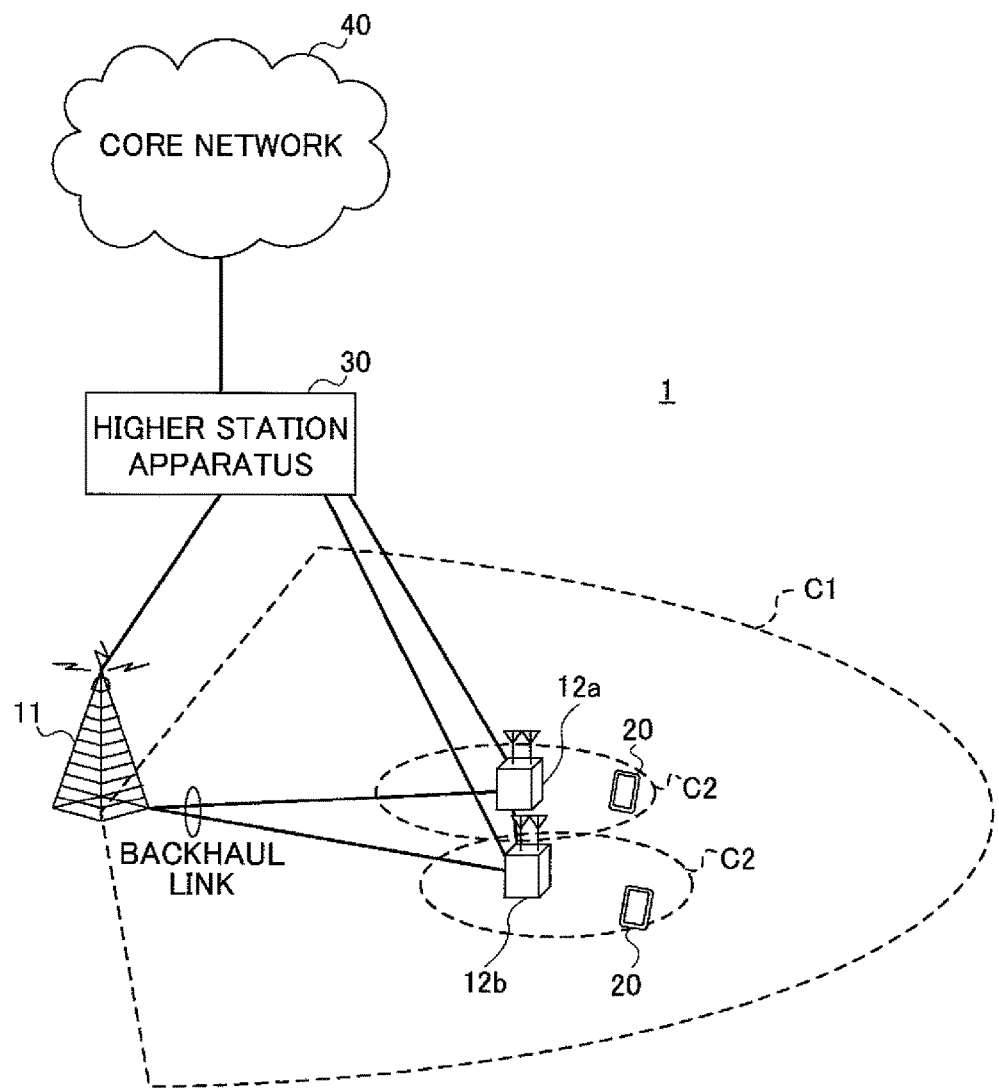
FIG. 9 is a schematic diagram to show an example of a radio communication system according to the present embodiment.

FIG. 9 is a schematic structure diagram of a radio communication system according to the present embodiment. Note that the radio communication system shown in FIG. 9 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G," "FRA (Future Radio Access)," etc.

The radio communication system 1 shown in FIG. 9 includes a radio base station 11 that forms a macro cell C1, and radio base stations 12a and 12b that are placed inside the macro cell C1 and form small cells C2, which are narrower than the macro cell C1. Also, user terminals 20 are placed in the macro cell C1 and in small cells C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base stations 12. Furthermore, it is possible that one of the radio base station 11 and the radio base stations 12 employs FDD and the other one employs TDD.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. The radio base stations 11 and 12 will be collectively referred to as "radio base station 10," unless specified otherwise. Each user terminal 20 is a terminal to support various communication schemes such as LTE, LTE-A and so on, and may include both a mobile communication terminal and a stationary communication terminal.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks, per terminal, and allowing a plurality of terminals to use mutually different bands.

Here, communication channels that are used in the radio communication system shown in FIG. 9 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are communicated by the PDSCH. Scheduling information for the PDSCH and the PUSCH and so on are communicated by the PDCCH (Physical Downlink Control Channel). The number of OFDM symbols to use for the PDCCH is communicated by the PCFICH (Physical Control Format Indicator CHannel). HARQ ACK/NACK in response to the PUSCH is communicated by the PHICH (Physical Hybrid-ARQ Indicator Channel). Also, the scheduling information for the PDSCH and the PUSCH and so on may be communicated by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are communicated by this PUSCH. Also, by means of the PUCCH, downlink radio quality information (CQI: Channel Quality Indicator), ACK/NACK and so on are communicated.

Figure 10:
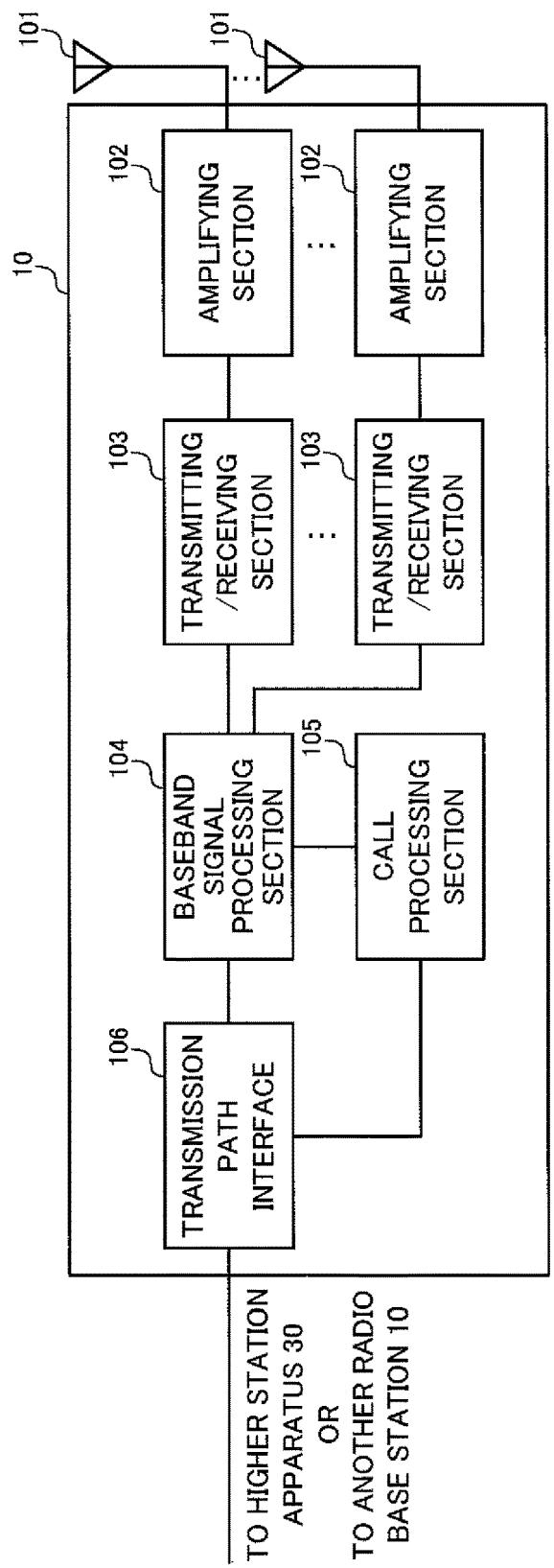
FIG. 10 is a diagram to explain an overall structure of a radio base station according to the present embodiment.

FIG. 10 is a diagram to show an overall structure of a radio base station 10 (which may be either a radio base station 11 or 12) according to the present embodiment. The radio base station 10 has a plurality of transmitting/receiving antennas 101 for MIMO communication, amplifying sections 102, transmitting/receiving section 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and are forwarded to each transmitting/receiving section 103.

Also, the baseband signal processing section 104 reports, to the user terminals 20, control information for allowing communication in the cell, through higher layer signaling (RRC signaling, broadcast signal and so on). The information for allowing communication in the cell includes, for example, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and the resultant signals are transmitted through the transmitting/receiving antennas 101.

On the other hand, as for data to be transmitted from the user terminals 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an FFT process, an IDFT process, error correction decoding, a MAC retransmission control receiving process, and RLC layer and PDCP layer receiving processes, and the result is forwarded to the higher station apparatus 30 via the transmission path interface 106. The call processing section 105 performs call processing such as setting up and releasing communication channels, manages the state of the radio base stations 10 and manages the radio resources.

Figure 11:
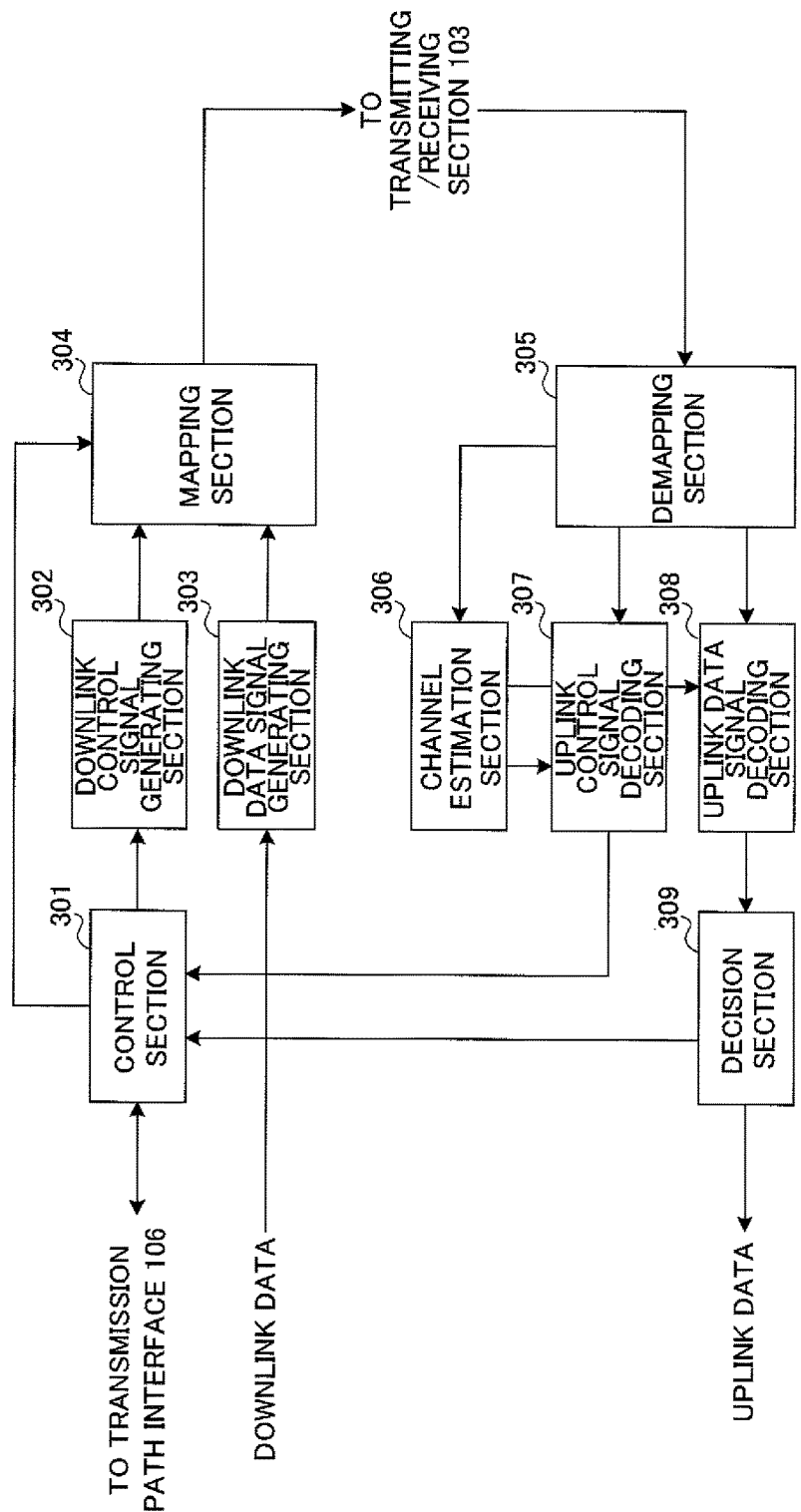
FIG. 11 is a diagram to explain a functional structure of a radio base station according to the present embodiment.

FIG. 11 is a diagram to show a principle functional structure of the baseband signal processing section 104 provided in the radio base station 10 according to the present embodiment. As shown in FIG. 11, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is communicated in the PDCCH and/or the enhanced PDCCH (EPDCCH), downlink reference signals and so on. Also, the control section 301 controls the scheduling of uplink data that is communicated in the PUSCH, uplink control information that is communicated in the PUCCH or the PUSCH, and uplink reference signals (allocation control). Information about the allocation control of uplink signals (uplink control signals and uplink user data) is provided to user terminals by using a downlink control signal (DCI: Downlink Control Information).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Also, as has been described with the above embodiments (the first to third embodiments and variation), the control section 301 controls the allocation of DL signals and UL signals of each frequency band (scheduling) based on capability information regarding simultaneous transmission and reception reported from the user terminals.

Figure 7:
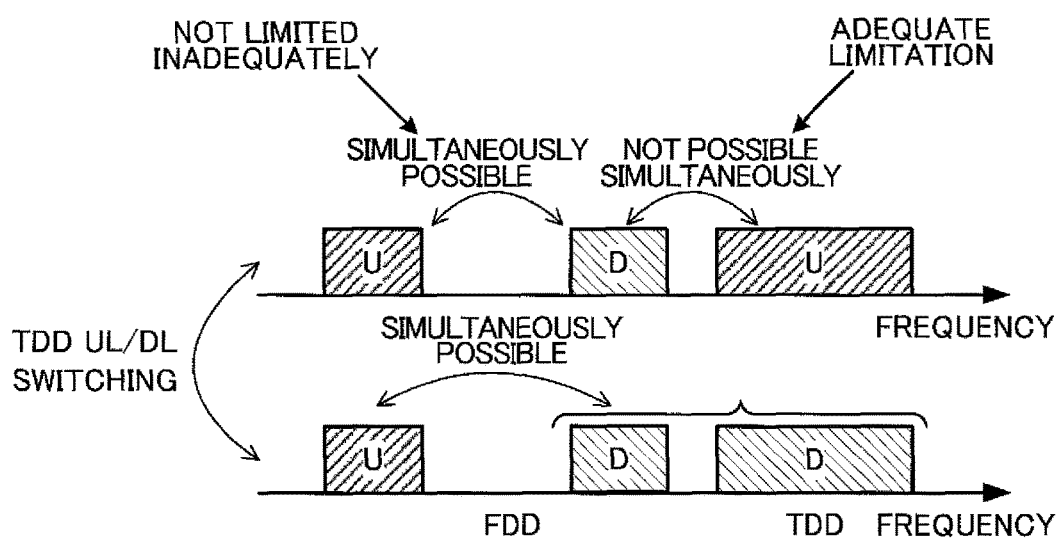
FIG. 7 is a diagram to explain scheduling based on simultaneous transmission and reception in a user terminal in TDD-FDD CA.

For example, when a report to the effect that simultaneous transmission and reception in FDD DL and TDD UL are not possible arrives from a user terminal, the control section 301 avoids carrying out allocation to FDD DL and TDD UL at the same time by controlling the scheduling of UL signals and DL signals in each frequency band (see above FIG. 7). Note that, in inter-eNB CA, the control section 301 is provided for each of multiple CCs, separately, and, in intra-eNB CA, the control section 301 is provided to be shared by multiple CCs. Also, in intra-eNB CA, the control section 301 can establish semi-static coordination with other base stations, via the communication path interface 106, based on capability information regarding simultaneous transmission and reception reported from the user terminals (see above FIG. 8).

The downlink control signal generating section 302 generates the downlink control signals (PDCCH signals and/or EPDCCH signals) determined to be allocated by the control section 301. To be more specific, based on commands from the control section 301, the downlink control signal generating section 302 generates a DL assignment to report downlink signal allocation information, and a UL grant to report uplink signal allocation information.

The downlink data signal generating section 303 generates downlink data signals (PDSCH signals). The data signals that are generated in the downlink data signal generating section 303 are subjected to a coding process and a modulation process, based on the coding rates and modulation schemes that are determined based on the CSI from each user terminal 20 and so on.

Based on commands from the control section 301, the mapping section 304 controls the allocation of the downlink control signals generated in the downlink control signal generating section 302 and the downlink data signals generated in the downlink data signal generating section 303, to radio resources.

The demapping section 305 demaps uplink signals transmitted from the user terminals and separates the uplink signals. The channel estimation section 306 estimates the channel state from the reference signals included in the received signal separated in the demapping section 305, and outputs the estimated channel state to the uplink control signal decoding section 307 and the uplink data signal decoding section 308.

The uplink control signal decoding section 307 decodes the feedback signals (delivery acknowledgement signals, etc.) transmitted from the user terminals through an uplink control channel (PUCCH), and outputs the results to the control section 301. The uplink data signal decoding section 308 decodes the uplink data signal transmitted from the user terminal in the uplink shared channel (PUSCH), and outputs the result to the decision section 309. The decision section 309 makes a retransmission control decision (ACK/NACK) based on the decoding result in the uplink data signal decoding section 308, and outputs the result to the control section 301.

Figure 12:
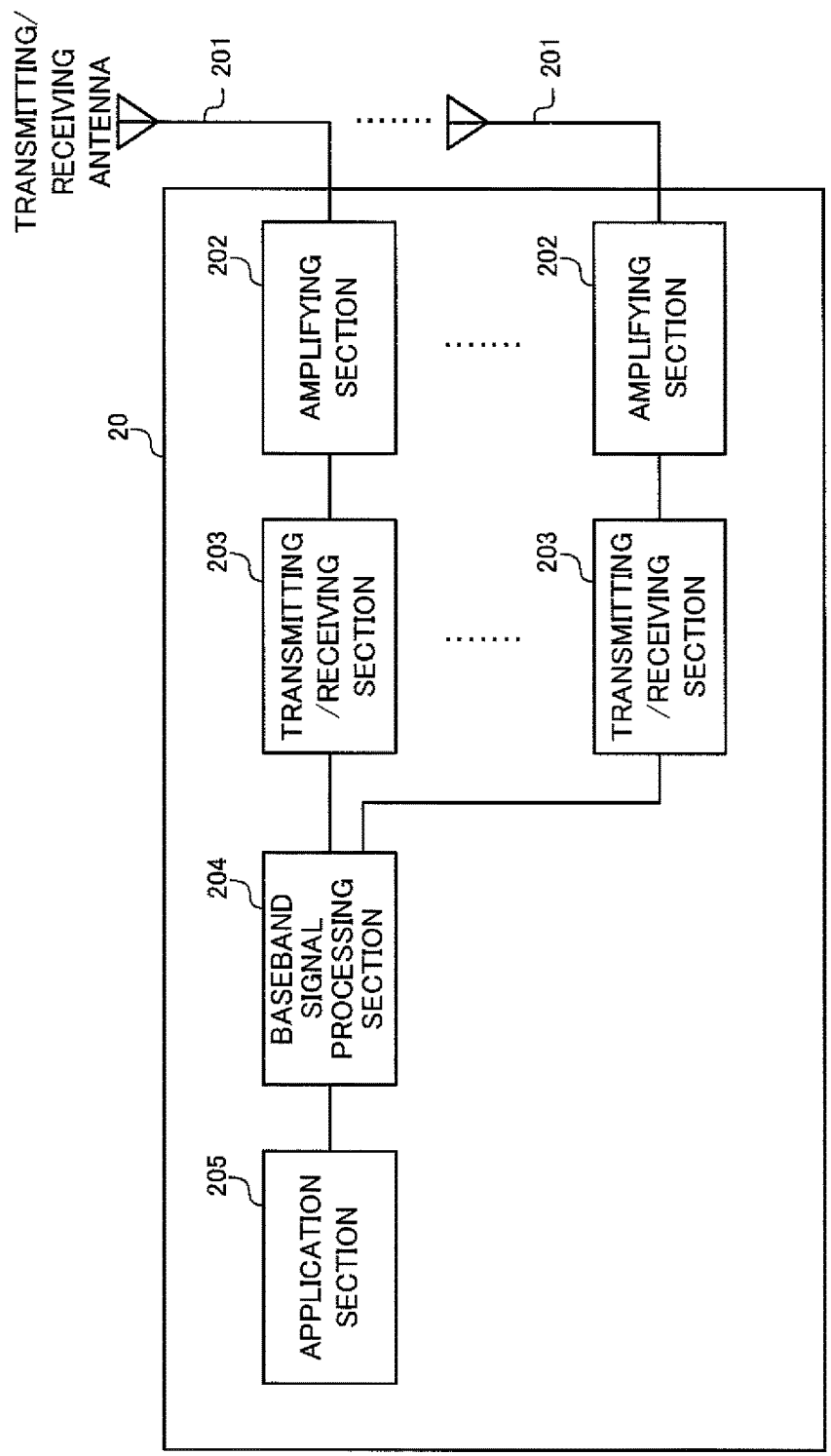
FIG. 12 is a diagram to explain an overall structure of a user terminal according to the present embodiment.

FIG. 12 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signals in the transmitting/receiving sections 203. The baseband signals are subjected to an FFT process, error correction decoding, a retransmission control receiving process and so on, in the baseband signal processing section 204. In this downlink data, downlink user data is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to the transmitting/receiving sections 203. The baseband signal that is output from the baseband signal processing section 204 is converted into a radio frequency band in the transmitting/receiving sections 203. After that, the amplifying sections 202 amplify the radio frequency signals having been subjected to frequency conversion, and the resulting signals are transmitted from the transmitting/receiving antennas 201.

Figure 13:
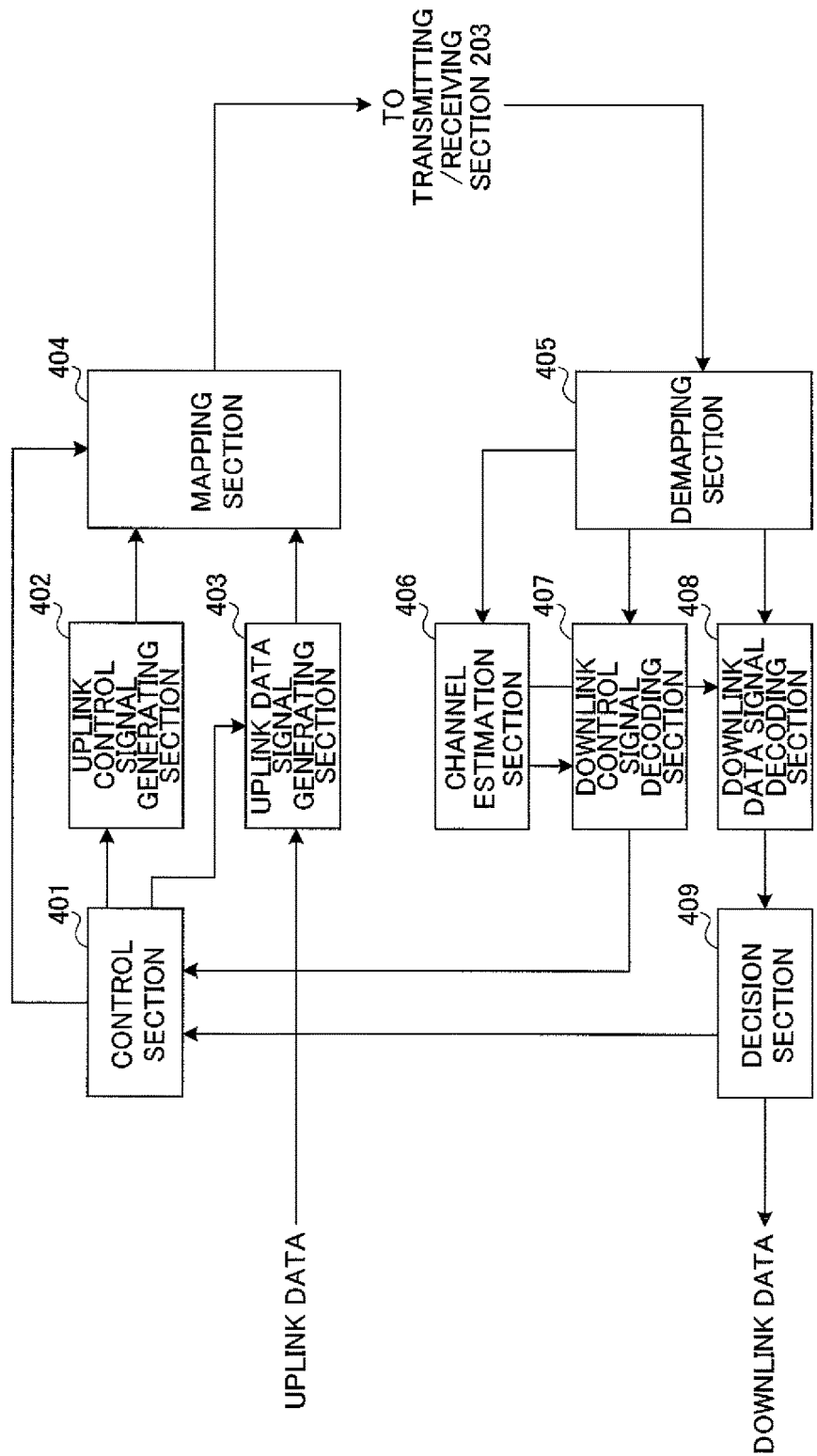
FIG. 13 is a diagram to explain a functional structure of a user terminal according to the present embodiment.

FIG. 13 is a diagram to show a principle functional structure of the baseband signal processing section 204 provided in the user terminal 20. As shown in FIG. 13, the baseband signal processing section 204 provided in the user terminal 20 is comprised at least of a control section 401 (report control section), an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals and uplink data signals. Furthermore, the control section 401 controls the generation and reporting of information related to user terminal capabilities (UE capabilities). That is, the control section 401 also functions as a report control section for higher layer signals and so on.

For example, as has been shown with the above embodiments (the first to third embodiments), the control section 401 executes control so that capability information regarding simultaneous transmission and reception in the transmitting/receiving sections 203 is included in a report and sent to the NW. To be more specific, the control section 401 executes control so that the capability information regarding simultaneous transmission and reception is included in user terminal capability information (UE capability signaling) and reported to the NW. As for the capability information regarding simultaneous transmission and reception, pieces of information including (1) full-duplex (no limitation of simultaneous transmission and reception is necessary), (2) simultaneous transmission and reception in FDD DL and TDD UL are not possible, (3) simultaneous transmission and reception in FDD UL and TDD DL are not possible, and (4) simultaneous transmission and reception are not possible in all frequencies that are subject to CA can be stipulated in two bits.

The uplink control signal generating section 402 generates uplink control signals based on commands from the control section 401. Also, the uplink data signal generating section 403 generates uplink data signals based on commands from the control section 401. Note that, when an uplink grant is contained in a downlink control signal reported from the radio base station, the control section 401 commands the uplink data signal generating section 403 to generate an uplink data signal.

The mapping section 404 (allocation section) controls the allocation of uplink control signals (delivery acknowledgement signals, etc.) and uplink data signals to radio resources (PUCCH and PUSCH) based on commands from the control section 401. For example, depending on the CC (cell) to send feedback (PUCCH transmission), the mapping section 404 allocates the delivery acknowledgement signals to the PUCCH of that CC.

The demapping section 405 demaps a downlink signal transmitted from the radio base station 10 and separates the downlink signal. The channel estimation section 406 estimates the channel state from the reference signals included in the received signal separated in the demapping section 405, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401.

The downlink data signal decoding section 408 decodes the downlink data signal transmitted in the downlink shared channel (PDSCH), and outputs the result to the decision section 409. The decision section 409 makes a retransmission control decision (ACK/NACK) based on the decoding result in the downlink data signal decoding section 408, and also outputs the result to the control section 401.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of claims. For example, the above-described embodiments may be combined and implemented as appropriate. Consequently, the description herein is provided for illustrative purposes only, and should by no means be construed to limit the present invention in any way.

The disclosure of Japanese Patent Application No. 2013-200015, filed on Sep. 26, 2013, including the specification, drawings and abstract, is incorporated herein by reference in its entirety.

The invention claimed is:

1. A user terminal, comprising:
  a transmitting/receiving section that receives DL signals transmitted from each of an FDD cell and a TDD cell and transmits UL signals to each of the FDD cell and the TDD cell; and
  a control section that controls carrier aggregation using the FDD cell and the TDD cell, and controls reporting of capability information regarding simultaneous transmission and reception of the DL signals and UL signals in the transmitting/receiving section,
  wherein the control section controls reporting of the capability information regarding simultaneous transmission and reception of the transmitting/receiving section with respect to every combination of a frequency band to use in the FDD cell and a frequency band to use in the TDD cell, and
  wherein the capability information regarding simultaneous transmission and reception includes information as to whether or not the transmitting/receiving section is capable of simultaneous transmission and reception with respect to a combination of a DL frequency band of the FDD cell and a UL frequency band of the TDD cell and information as to whether or not the transmitting/receiving section is capable of simultaneous transmission and reception with respect to a combination of a UL frequency band of the FDD cell and a DL frequency band of the TDD cell.

2. The user terminal according to claim 1, wherein the capability information regarding simultaneous transmission and reception includes information as to whether or not the transmitting/receiving section is capable of full-duplex in the FDD cell and information as to whether or not the transmitting/receiving section is capable of simultaneous transmission and reception with respect to all frequencies that are subject to carrier aggregation.

3. The user terminal according to claim 1, wherein the control section reports the capability information regarding simultaneous transmission and reception as user terminal capability information.

4. The user terminal according to claim 1, wherein the capability information regarding simultaneous transmission and reception is stipulated, for every combination of frequency bands that are subject to carrier aggregation, as a parameter of the combination of frequency bands.

5. The user terminal according to claim 1, wherein the control section reports the capability information regarding simultaneous transmission and reception as user terminal capability information.

6. The user terminal according to claim 1, wherein the capability information regarding simultaneous transmission and reception is stipulated, for every combination of frequency bands that are subject to carrier aggregation, as a parameter of the combination of frequency bands.

7. A base station comprising:
  a receiving section that receives capability information regarding simultaneous transmission and reception of DL signals and UL signals in the user terminal; and
  a control section that executes carrier aggregation with another base station that uses a different duplex mode, and controls scheduling of DL signals and UL signals for the user terminal based on the capability information regarding simultaneous transmission and reception of the user terminal,
  wherein the receiving section receives the capability information regarding simultaneous transmission and reception of the user terminal with respect to every combination of a frequency band to use in the FDD cell and a frequency band to use in the TDD cell, and
  wherein the capability information regarding simultaneous transmission and reception includes information as to whether or not the transmitting/receiving section is capable of simultaneous transmission and reception with respect to a combination of a DL frequency band of the FDD cell and a UL frequency band of the TDD cell and information as to whether or not the transmitting/receiving section is capable of simultaneous transmission and reception with respect to a combination of a UL frequency band of the FDD cell and a DL frequency band of the TDD cell.

8. The base station according to claim 7, wherein the receiving section receives the capability information regarding simultaneous transmission and reception of the user terminal as two-bit user capability information.

9. The base station according to claim 8, wherein:
  a restriction for simultaneous transmission and reception with respect to each combination of the frequency band to use in the FDD cell and the frequency band to use in the TDD cell is stipulated in advance; and the control section controls scheduling in accordance with a condition of a greater restriction between the restriction for simultaneous transmission and reception that is stipulated in advance and the capability information regarding simultaneous transmission and reception that is reported from the user terminal.

10. The base station according to claim 7, wherein:

a restriction for simultaneous transmission and reception with respect to each combination of the frequency band to use in the FDD cell and the frequency band to use in the TDD cell is stipulated in advance; and the control section controls scheduling in accordance with a condition of a greater restriction between the restriction for simultaneous transmission and reception that is stipulated in advance and the capability information regarding simultaneous transmission and reception that is reported from the user terminal.

11. The base station according to claim 7, wherein, when inter-base station carrier aggregation is employed, the control section controls allocation of the DL signals and/or the UL signals not to coincide with allocation by the other base station, based on the capability information regarding simultaneous transmission and reception of the user terminal.

12. A radio communication method for a user terminal, the radio communication method comprising:

receiving DL signals transmitted from each of an FDD cell and a TDD cell and transmitting UL signals to each of the FDD cell and the TDD cell;

controlling carrier aggregation using the FDD cell and the TDD cell; and controlling reporting of capability information regarding simultaneous transmission and reception of the DL signals and UL signals in the user terminal, wherein the capability information regarding simultaneous transmission and reception includes capability information regarding simultaneous transmission and reception of the user terminal with respect to every combination of a frequency band to use in the FDD cell and a frequency band to use in the TDD cell, and wherein the capability information regarding simultaneous transmission and reception includes information as to whether or not the transmitting/receiving section is capable of simultaneous transmission and reception with respect to a combination of a DL frequency band of the FDD cell and a UL frequency band of the TDD cell and information as to whether or not the transmitting/receiving section is capable of simultaneous transmission and reception with respect to a combination of a UL frequency band of the FDD cell and a DL frequency band of the TDD cell.

* * * * *